United States Patent [19]

Miura et al.

[11] Patent Number: 4,510,530

[45] Date of Patent: Apr. 9, 1985

[54] SIGNAL REPRODUCING CIRCUIT FOR A VIDEO TAPE RECORDER

[75] Inventors: Kuniaki Miura, Yokosuka; Akira Shibata, Katsuta; Jun Yamada, Yokohama; Katashi Hazama, Zushi, all of Japan

[73] Assignee: Hitachi, Ltd., Tokyo, Japan

[21] Appl. No.: 389,968

[22] Filed: Jun. 18, 1982

[30] Foreign Application Priority Data

Jun. 26, 1981 [JP] Japan ................................. 56-98222
Jan. 11, 1982 [JP] Japan ................................... 57-1827

[51] Int. Cl.³ .............................................. H04N 9/48
[52] U.S. Cl. ..................................... 358/314; 358/37; 358/327
[58] Field of Search ............... 358/27, 21 R, 310, 314, 358/327, 330

[56] References Cited

U.S. PATENT DOCUMENTS 4,245,262 1/1981 Ohtsu .................... 358/314
4,368,483 1/1983 Liu ....................... 358/314

Primary Examiner—Richard Murray
Attorney, Agent, or Firm—Antonelli, Terry & Wands

[57] ABSTRACT

In a FM luminance signal circuit of a signal reproducing circuit of a video tape recorder, (a) a reproduced signal is up-converted by an up-converter, the up-converted signal is divided into two frequency components by a surface acoustic wave filter having a first filter for peaking a high frequency component and a second filter for peaking a low frequency component, a limiter connected to the first filter, an amplifier connected to the second filter, and an adder of an output of a limiter and an output of an amplifier, and the reversal of the levels of the FM carrier signal and side band signal is prevented by above configuration.

(b) A side-band glass delay line of 1H (one horizontal scan period) is provided to get 1H delayed luminance signal. Using main luminance signal and 1H delayed luminance signal, a line correlation circuit and a video dropout compensation circuit are realized.

(c) In a PAL signal reproducing circuit, where a chrominance signal is delayed by 1H by a comb filter using 2H delay line, 1H delayed luminance signal is used to prevent a chrominance displacement from the luminance signal.

10 Claims, 28 Drawing Figures

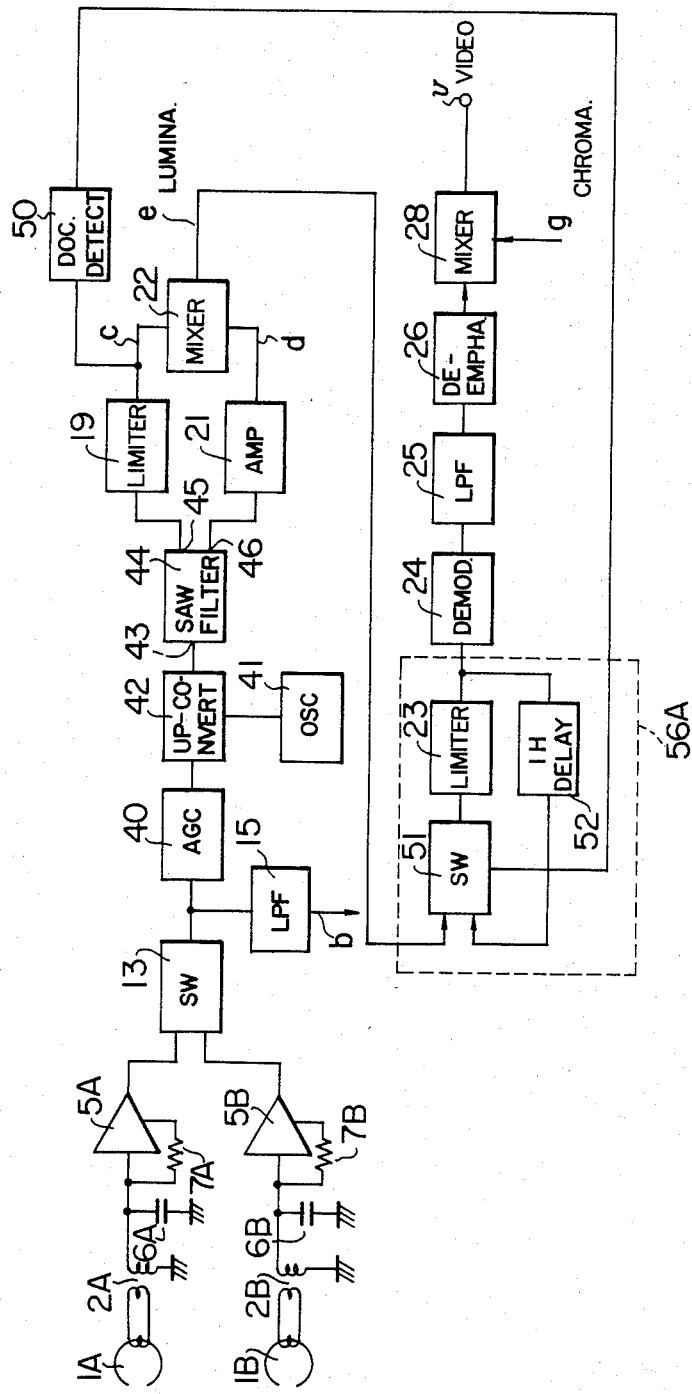

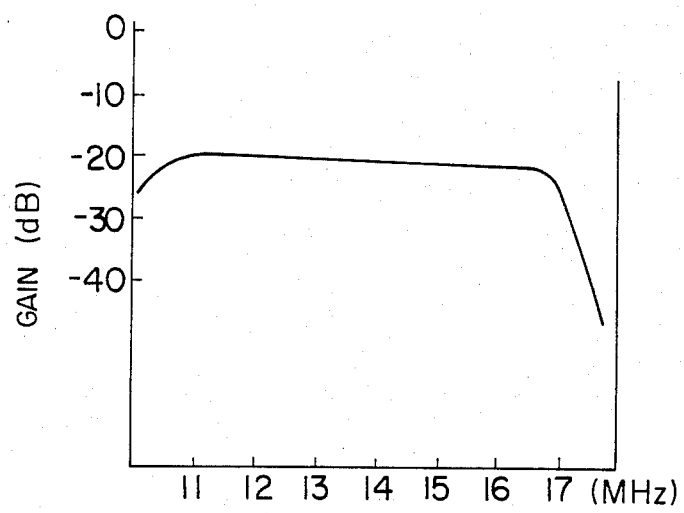
F I G. 21

F I G. 23A
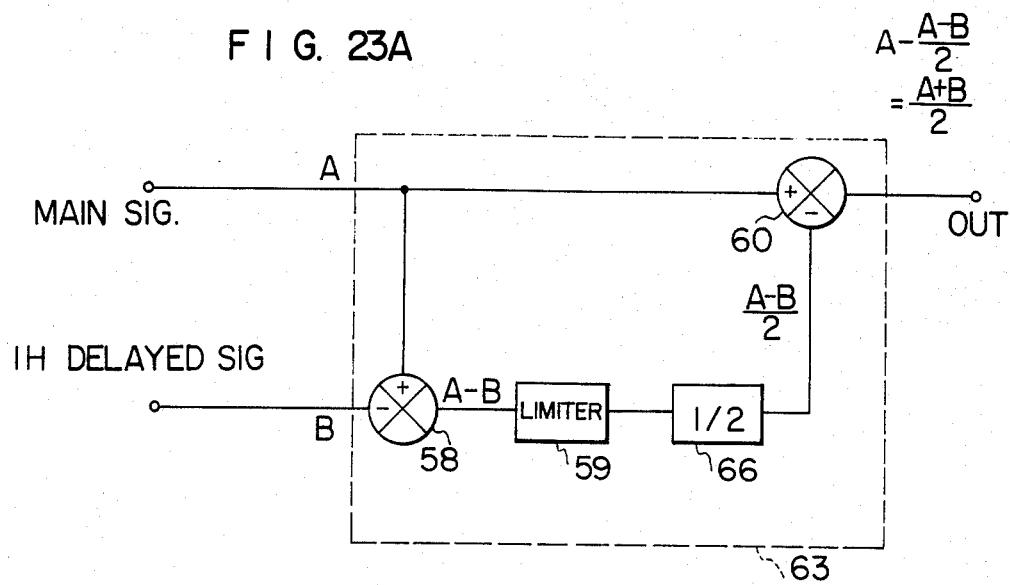
F I G. 23B
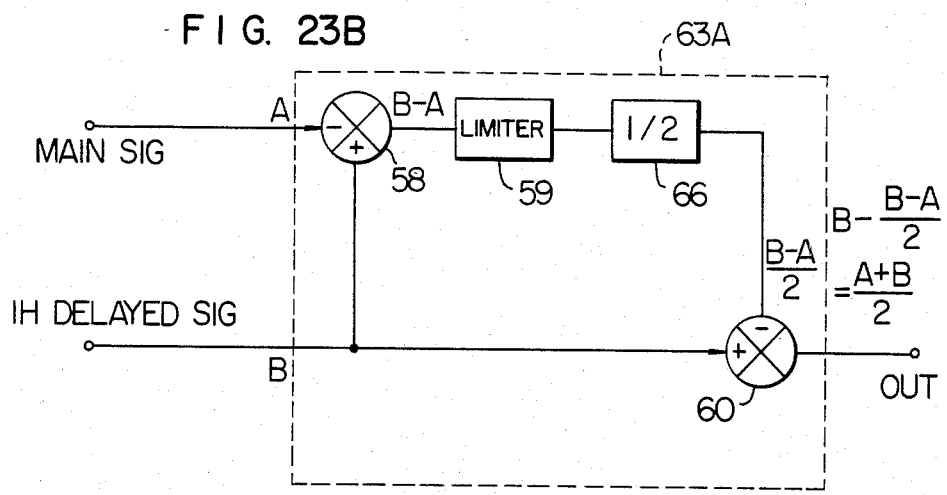

SIGNAL REPRODUCING CIRCUIT FOR A VIDEO TAPE RECORDER

BACKGROUND OF THE INVENTION

The present invention relates to a signal processing circuit, more particularly to a signal reproducing circuit of a VTR or the like.

FIG. 1 shows an example of a conventional reproducing circuit of a home VTR (of VHS system, for example). Signals read from head 1A and 1B are supplied to pre-amplifiers 5A and 5B through rotary transformers 2A and 2B, resonance capacitors 3A and 3B, and damping resistors 4A and 4B, respectively. The head 1A, the rotary transformer 2A and the resonance capacitor 3A, and the head 1B, the rotary transformer 2B and the capacitor 3B are designed to have peaking frequencies near a white carrier (which is at 4.4 MHz in the VHS system) of an FM luminance signal. The damping resistors 4A and 4B serve to adjust peaking Q. FIG. 2 shows examples of a gain 11 and a group delay characteristic 12 of a prior art peaking circuit. In L-C resonance peaking, the group delay characteristic is not flat as shown in FIG. 2. A purpose of the peaking is to modify a frequency characteristic and match the heads 1A and 1B to the pre-amplifiers 5A and 5B to improve a noise figure. Outputs of the pre-amplifiers 5A and 5B are mixed by a switching circuit 13 actuated by a 30 Hz (in NTSC system) pulse train to produce a continuous signal, one portion of which is converted to the FM luminance signal a through a high-pass filter (HPF) 14 and the other portion of which is converted to a chroma signal b through a low-pass filter (LPF) 15. The FM luminance signal a is applied to an amplitude equalizer 16 which mainly equalizes an amplitude and one portion of an output of an amplitude equalizer 16 is supplied to a phase equalizer 17 which mainly equalizes a phase, a high-pass filter (HPF) 18 and a limiter 19 to produce a high frequency component c, and the other portion is applied to a low-pass filter (LPF) 20 and an amplifier circuit 21 to produce a low frequency component d. The high frequency component c and the low frequency component d are mixed by a mixer circuit 22. The equalizer 17, the HPF 18 and the limiter 19, and the LPF 20 and the amplifier circuit 21, and the mixer circuit 22 form a reversal prevention cricuit 10. When a reproduced output of the head decreases due to an increase of a spacing between the head and a tape, the high frequency component c is kept at a constant level because the amplitude thereof is clamped by the limiter 19, an amplitude of the low frequency component d decreases in proportion to a level of the reproduced output of the head. As a result, a mixed signal e of these components c and d is emphasized in a high frequency region. The higher is the frequency, the more is the decrease of the reproduced output of the head. Consequently, a reversal phenomenon in which a carrier of the FM luminance signal is lower than a level of a lower side band would normally occur. Such a reversal can be prevented by the above circuit configuration which emphasizes a high frequency region. The mixed signal e is applied to a limiter 23, a demodulator 24, a LPF 25 and a deemphasis circuit 26 to produce a luminance signal f, which is mixed with a chrominance (or chroma) signal g from a signal processing circuit 27 by a mixing circuit 28 to produce a video signal v.

The prior art circuit shown in FIG. 1 has the following disadvantages in the performance and the cost:

(1) The group delay characteristic is not flat (see FIG. 2) because the peaking is effected by the LC resonance circuit.

(2) The compensation by the equalizer 16 provided to compensate for the amplitude characteristic and the group delay characteristic is insufficient.

(3) The HPF 14 is necessary to separate the luminance signal.

(4) The phase equalizer 17 for the high frequency component c and the low frequency component d is necessary in the reversal prevention circuit.

FIG. 3 shows an example of a PAL signal reproducing circuit in a prior art home video system. Reproduced signals from heads 1A and 1B are supplied to pre-amplifiers 5A and 5B through rotary transformers 2A and 2B, resonance capacitors 3A and 3B and damping resistors 4A and 4B, respectively. The head 1A, the rotary transformer 2A and the resonance capacitor 3A, and the head 1B, the rotary transformer 2B and the resonance capacitor 3B are both designed to have peaking frequencies near a white carrier (4.4 MHz in the VHS system) of an FM luminance signal. The damping resistors 4A and 4B serve to adjust peaking Q. Outputs of the pre-amplifiers 5A and 5B are mixed by a switching circuit 13 actuated by a head switching pulse train (at 30 Hz in the NTSC system and 25 Hz in the PAL system) to produce a continuous signal, one portion of which is supplied to a HPF 14 to produce a luminance signal a and the other portion of which is supplied to a LPF 15 to produce a chroma signal b (at 627 KHz in the VHS system). The FM luminance signal a is supplied to an FM drop-out compensation circuit (FMDOC) 34 comprising a switch 32 and a 1H-delay line (where 1H is one horizontal scan period), a phase equalizer 35, a limiter 36, a demodulator 37, a LPF 38 and a deemphasis circuit 39 to produce a luminance signal f. On the other hand, the chroma signal b from the LPF 15 is supplied to an up-converter 29 to produce a chroma signal c of 4.43 MHz, which is supplied to a comb filter 27 comprising a 2H-delay line 30 and a subtraction circuit 31 to produce a chroma signal e having a reduced influence by adjacent tracks on a tape. The chroma signal e is mixed with the luminance signal f by a mixer circuit 28 to produce a video signal v.

FIG. 4 shows time relations between luminance signals 70 and chroma signals 71, in which (A) shows a time relation between the luminance signal f and the chroma signal b of FIG. 1, (B) shows a time relation between the luminance signal f and the 2H-delayed chroma signal d, and (C) shows a time relation between the luminance signal f and the chroma signal e at the output of the comb filter 27. In the (A), a chroma center (center of lateral symmetry) is at 72 between C2 and C3, and a corresponding position of the luminance signal is between Y3 and Y4. In the (C), however, the chroma center is at 73 between Y4 and Y5 of the luminance signal and it is delayed by 1H relative to the (A). On a TV screen, it corresponds to that the chroma signal is shifted down by 1H relative to the luminance signal for each recording/reproducing operation of the VTR. When dubbing is repeated by the VTR, the chroma center is shifted down by 1H for each dubbing and a quality of image is significantly degraded.

SUMMARY OF THE INVENTION

It is an object of the present invention to provide a VTR signal reproducing circuit including a surface acoustic wave filter (SAW filter) for reproduction equalizing.

It is another object of the present invention to provide a device for preventing chrominance displacement in the reproduction of a PAL signal in a home VTR.

It is other object of the present invention to provide a device which improves an S/N ratio of an FM luminance signal and compensates for a dropout of a video signal in a VTR at the same time.

It is other object of the present invention to provide a VTR signal reproducing circuit which totally realizes the above-mentioned functions of the VTR with good productivity and performances.

According to the present invention, a VTR reproducing circuit including a SAW filter with one input and two outputs provides a peaking function exhibiting flat group delay characteristics and a high-pass and low-pass filtering function. This circuit configuration has a reverse preventing function. The VTR reproducing circuit can include a frequency-modulation dropout compensation circuit (FMDOC) a video DOC, a line correlation circuit using intercorrelation between a main signal and its 1H delay signal, and a chrominance displacement preventing circuit delaying luminance signals by 1H. A wide-band 1H delay line may be commonly used in the line correlation circuit and the displacement preventing circuit.

BRIEF DESCRIPTION OF THE DRAWINGS

FIG. 12 shows a block diagram of another embodiment of the signal reproducing circuit of the present invention.

FIG. 21 shows a frequency characteristic curve of an insertion loss of a 1H-delay line.

FIGS. 23A and 23B show block diagrams of the line correlation circuits of the NTSC system and the PAL system, respectively.

DESCRIPTION OF THE PREFERRED EMBODIMENTS

Figure 1:
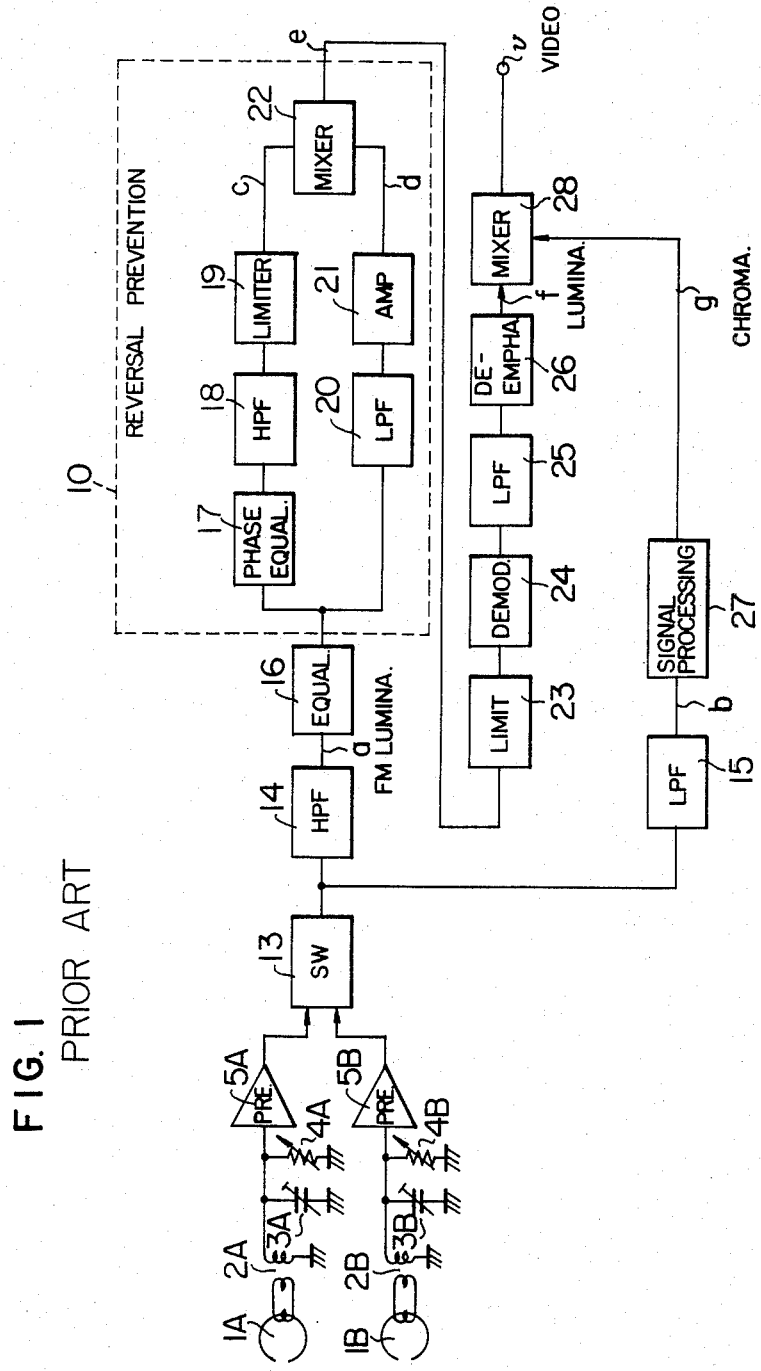
FIG. 1 shows a block diagram of a signal reproducing circuit in a prior art VTR.
Figure 5:
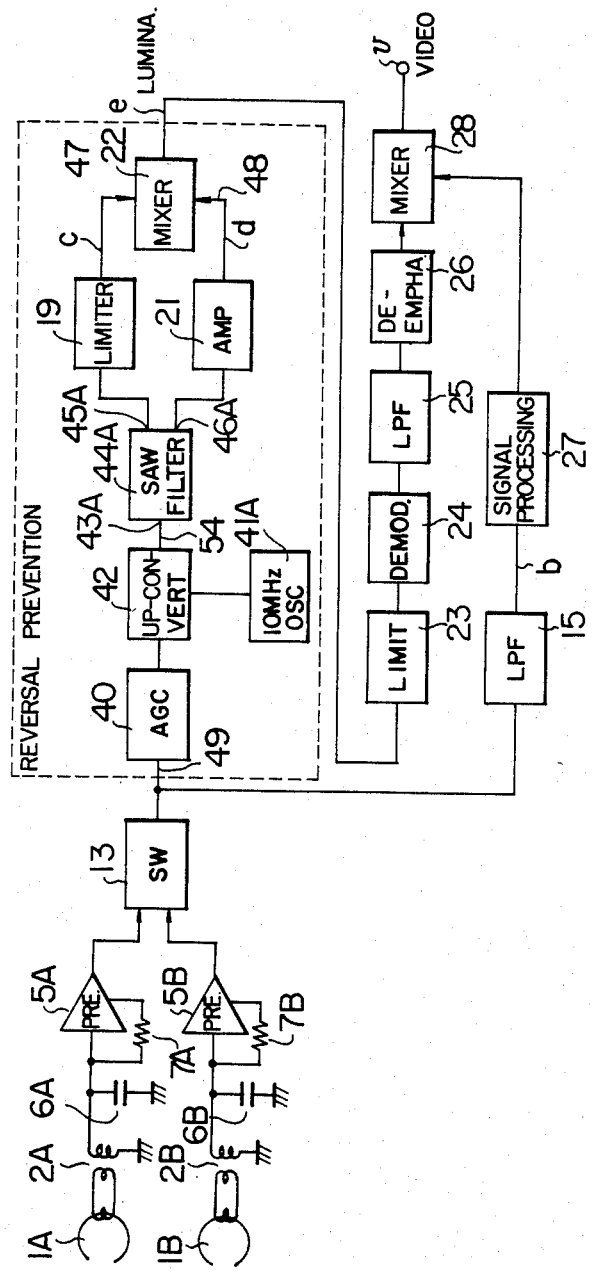
FIG. 5 shows a block diagram of one embodiment of a signal processing circuit of the present invention.

FIG. 5 shows one embodiment of the signal reproducing circuit of the present invention. The present embodiment uses fixed capacitors 6A and 6B instead of the resonance capacitors 3A and 3B of the prior art circuit shown in FIG. 1, feedback resistors 7A and 7B instead of the damping resistors 4A and 4B, and an automatic gain control (AGC) circuit 40, an up-converter circuit 42, an oscillator 41A and a SAW filter 44A instead of the HPF 14, the equalizers 16 and 17, the HPF 18 and the LPF 20. By this arrangement, the feedback damping is realized without degrading a noise figure of the pre-amplifiers to flatten the reproducing frequency characteristic at the input of the pre-amplifiers in a range of 1-6 MHz to absorb a dispersion of inductances of the heads depending on the manufacturing processes. As a result, the adjustment of the resonance capacitors 3A and 3B and the damping resistors 4A and 4B to the dispersion of the inductances of the heads as is required in the prior art circuit is not necessary. The peaking is attained by the SAW filter 44A as will be explained later.

A technique of a surface acoustic wave (SAW) filter used for intermediate frequency filters of TV receivers is disclosed in U.S. Pat. No. 4,223,285 issued to Hazama et al. A VTR signal reproducing circuit using a SAW filter is disclosed in the Japanese Patent Application No. 183919/1980 of the present assignee filed on Dec. 26, 1980 from which the present invention has further developed.

The peaking circuit and the equalizer 17, the HPF 18 and the LPF 20 of the prior art reversal prevention circuit 10 are formed in the single SAW filter 44A. A band of the SAW filter 44A is selected to 11–17 MHz considering a shape of the device and a propagation characteristic. The reproduced FM luminance signal which has a band of 1–7 MHz (in the VHS system) is up-converted by approximately 10 MHz by the oscillator (approximately 10 MHz) 41A and the up-converter circuit 42.

The AGC circuti 40 is inserted before the up-converter 42 so that an input signal level to the SAW filter 44A is kept constant for different amplitudes of reproduced outputs from the heads 1A and 1B. The AGC circuit 40 may be inserted between the up-converter 42 and the SAW filter 44A.

The function of the SAW filter 44A is now explained in detail.

Figure 2:
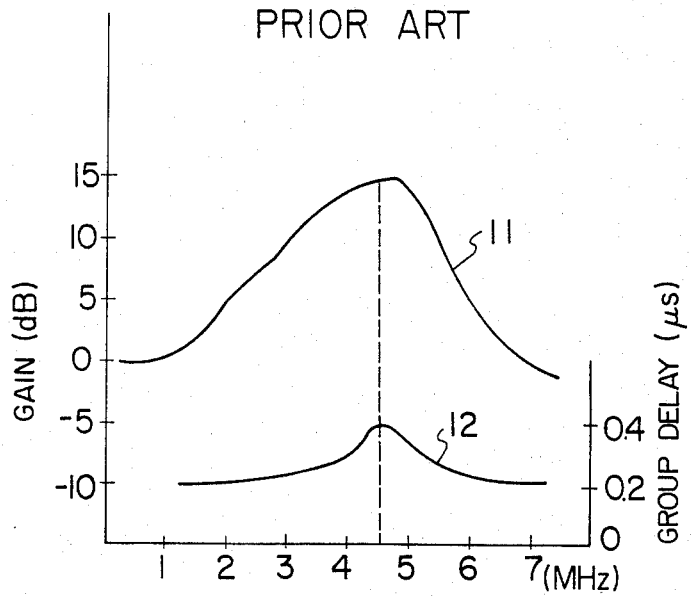
FIG. 2 shows characteristic curves of a gain and a group delay in a prior art peaking circuit.
Figure 6:
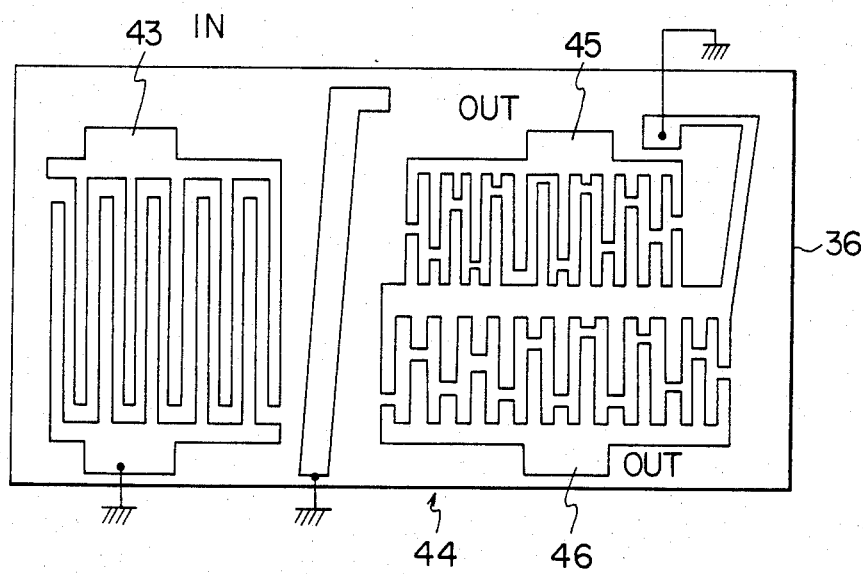
FIG. 6 shows a construction of a SAW filter used in the present invention.
Figure 7:
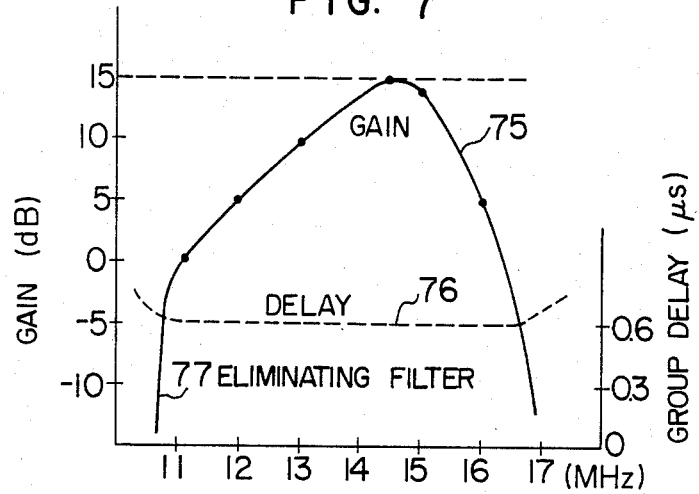
FIG. 7 shows a peaking characteristic curve of the SAW filter.

FIG. 6 shows a structure of electrodes of the SAW filter. A 128° Y-axis cut LiNbO$_3$ single crystal is used as a piezoelectric substrate, and a direction of propagation of the surface acoustic wave is set in an X-direction. An input electrode 43 has a center frequency of 14.62 MHz and an electrode width of 33.2 μm. It has 4.5 pairs of interdigital normal type electrodes having constant interdigital crossing length and pitch. Output electrodes 45 and 46 have ten pairs of weighted electrodes having different interdigital crossing lengths and pitches. The electrodes are formed by photo-lithographing aluminum-deposited films of 6000 Å thick. An example of a peaking characteristic in the VHS system VTR is shown in FIG. 2. In the SAW filter 44, 10 MHz-up-converted peaking characteristic 75 and group delay characteristic 76 as shown in FIG. 7 are obtained. They differ from the prior art in that:

(1) The group delay characteristic is substantially flat in the frequency band.

(2) A filter 77 (trap filter or HPF) for eliminating a down-converted chroma signal or an FM voice signal frequency-multiplexed between the down-converted chroma signal and the FM luminance signal, as shown in FIG. 15, can be integrally formed.

(3) By imparting a trap characteristic or LPF characteristic in 17-18 MHz to the SAW filter, a high frequency noise can be reduced.

Figure 8:
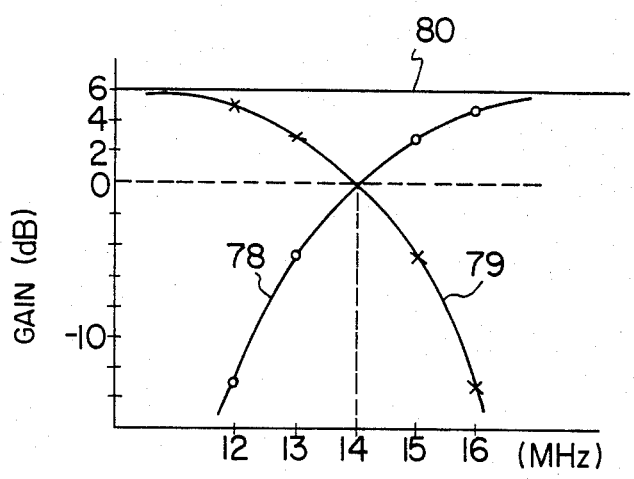
FIG. 8 shows characteristic curves of a HPF and a LPF used in an reversal prevention circuit.

In the present invention, because the reversal prevention circuit to be described later is formed by the SAW filter 44A, not only the peaking characteristic described above but also an HPF characteristic 78 and a LPF characteristic 79 shown in FIG. 8 are included. The addition of the HPF characteristic 78 and the LPF characteristic 79 results in a approximately flat characteristic 80.

Figure 9:
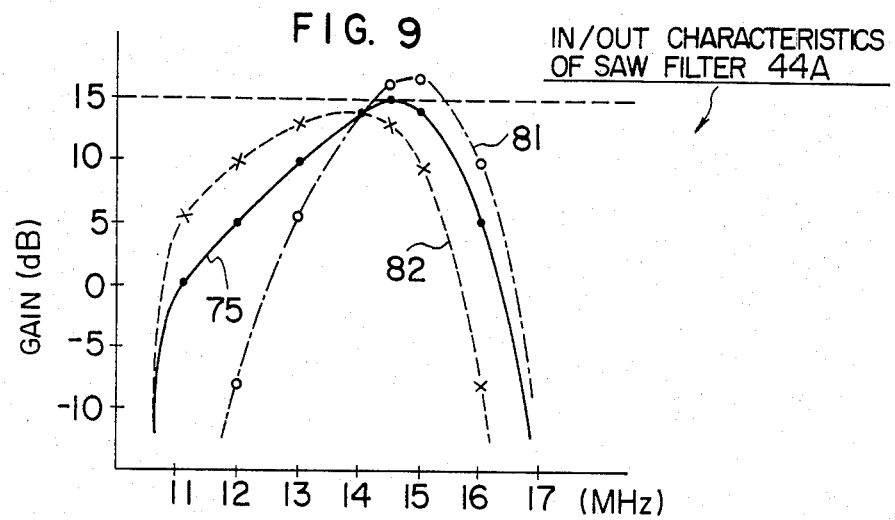
FIG. 9 shows characteristic curves for illustrating differences of the peaking characteristic of different electrodes of the SAW filter.

FIG. 9 shows input/output characteristics of the SAW filter 44A. A characteristic derived from a product of transfer functions of the input electrode 43 and the output electrode 45 is represented by a high-pass peaking characteristic 81 which is a sum of a peaking characteristic 75 and the HPF characteristic 78, and a characteristic derived from a product of transfer functions of the input electrode 43 and the output electrode 46 is represented by a low-pass peaking characteristic 82 which is a sum of the peaking characteristic 75 and the LPF characterstic 79. The outputs of the output electrodes 45 and 46 have the same polarity relative to ground, and when they are combined at an equal ratio, the input/output characterstic is shown by the curve 75 which corresponds to the peaking characteristic 75 shown in FIG. 7. It is possible to invert the polarities of the outputs of the output electrodes 45 and 46 and the polarities of a limiter 19 and an amplifier circuit 21 so that the signals c and d are of the same polarity as a whole.

The input electrode and the pair of output electrodes may be in any combination of the normal type and the weighted type.

Figure 10:
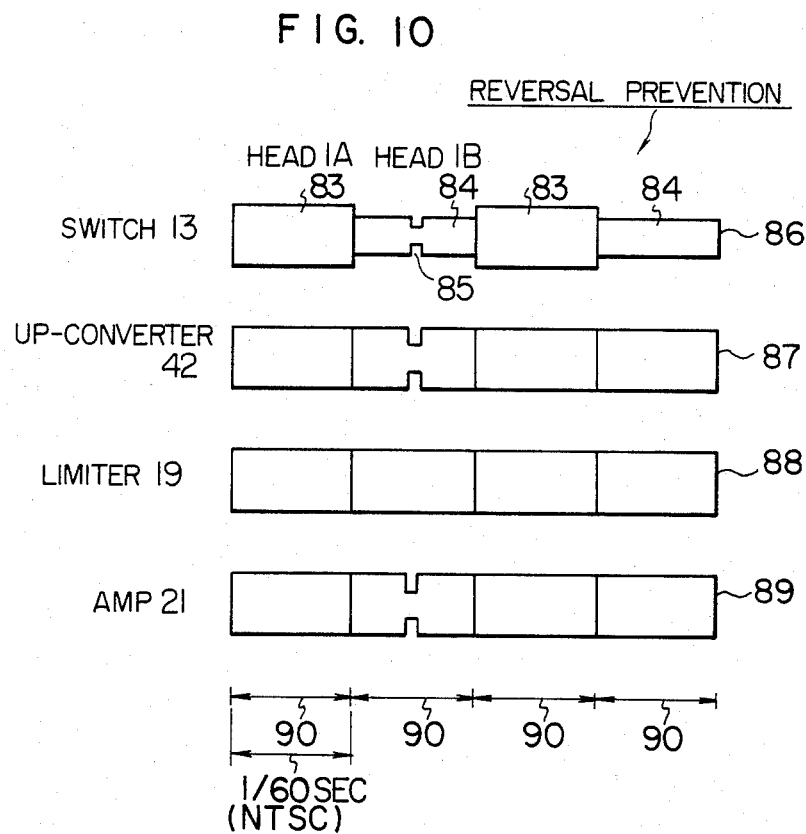
FIG. 10 illustrates the operation of the reversal prevention circuit.
Figure 11:
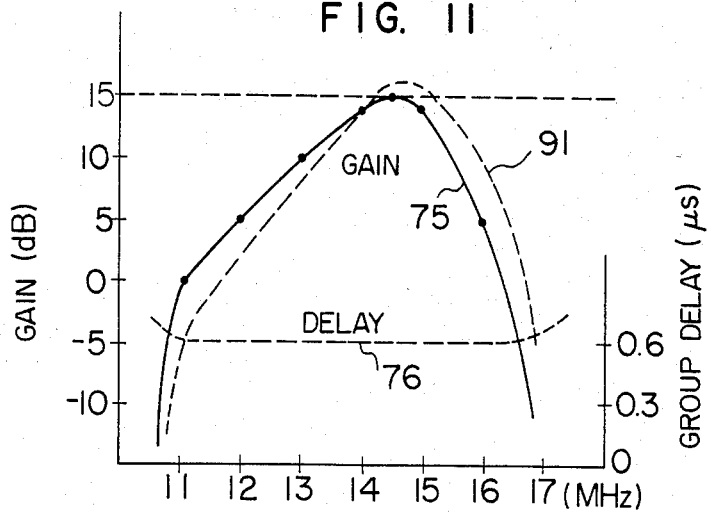
FIG. 11 shows peaking characteristic curves in the operation of the reversal prevention circuit.

FIG. 10 shows signal amplitudes for explaining the operation of the reversal prevention circuit comprising the SAW filter 44A, the limiter 19, the amplifier 21, the mixer 22 and the AGC circuit 40 in the first embodiment of the present invention shown in FIG. 5. An output 49 from the switching circuit 13 includes an output 83 of the head 1A and an output of the head 1B alternately, which have a difference therebetween due to a manufacturing dispersion of the heads. The output level falls for a short time period t as shown by 85. A cycle of the heads 1A and 1B is one field (1/60 seconds) 90 in the NTSC system. The AGC circuit 40 has a time constant which is appropriate to compensate for the difference between the field outputs. As a result, the input 87 to the SAW filter 44A after the up-conversion has no difference between the field outputs and has a predetermined constant amplitude. The time constant is selected such that the AGC 40 does not respond to the output fall 85 of the short time period t. When the signal is applied to the SAW filter 44A, the output of the output electrode 45 which exhibits the high-pass peaking characteristic 81 shown in FIG. 9 is applied to the limiter 19, which produces an output 88. The limiter compensates the output fall of the short time period t to produce the constant amplitude output. On the other hand, the output of the output electrode 46 which exhibits the low-pass peaking characteristic is applied to the amplifier 21, which produces an output 89. It includes the output fall of the short time period t. The gains of the limiter 19, the amplifier 21 and the AGC circuit 40 are set such that the outputs 88 and 89 have the same amplitude except for the short time period t. The outputs 88 and 89 are mixed in the mixer 22, and the HPF characteristic and the LPF characteristic cancel with each other except for the short time period t so that a normal peaking characteristic as shown by 75 in FIG. 11 (same as 75 in FIG. 7) is attained. In the time period t, the output of the limiter 19 is larger than the output of the amplifier 21 and hence a resulting peaking characteristic 91 shown in FIG. 11 is emphasized in a high frequency region. As described above, when the output decreases, the higher the frequency is, the larger is the degree of decrease of the output and hence the levels of the FM carrier and the lower side band are reversed. The arrangement described above prevents such reversal or inversion. Major advantages of forming the peaking circuit and the reversal prevention circuit by the SAW filters are:

(1) Since the group delay characteristic 76 in the band is always substantially flat despite the change of the peaking characteristic by the level of the reproduced output, no waveform distortion nor ringing takes place.

(2) The adjustment of the delay times of the high-pass peaking circuit and the low-pass peaking circuit can be readily attained by adjusting a center position of the normal type input electrode 43 and maximum crossing length points of the weighted output electrodes 45 and 46.

It also contributes to reduce the number of elements and simplify the circuit configuration.

FIG. 12 shows another embodiment of the signal reproducing circuit of the present invention which has a drop-out compensation circuit. It differs from the embodiment of FIG. 5 in that it includes a drop-out detection circuit 50, a switch 51 and a 1H-delay line 52. It is preferable to detect the drop-out at an output stage or an intermediate stage of the limiter 19 having the emphasized FM carrier although it may be detected at the junction of the mixer 22 and the switch 51. Since the signal frequency band is 11-17 MHz which is higher than that of the prior art, the 1H-delay line 52 may be a glass delay line having a wide pass band without substantial degradation of the drop-out compensation signal.

Figure 13A:
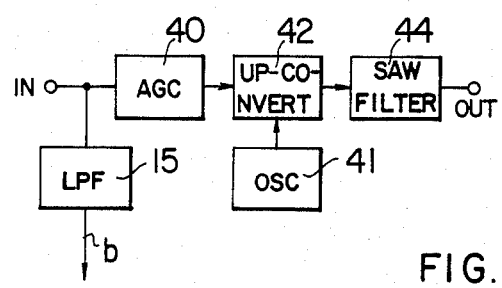
FIGS. 13a to 13c show block diagrams for illustrating a position of AGC.
Figure 13B:
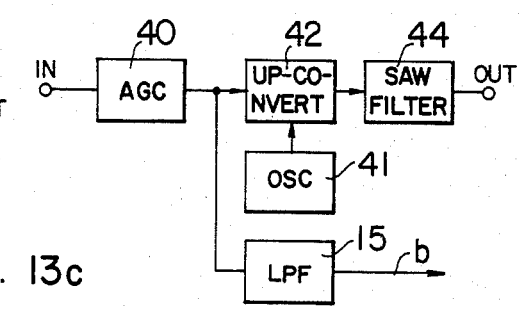
Figure 13C:
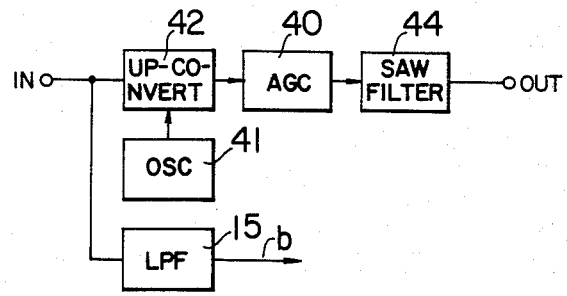

In the above embodiments, the AGC circuit 40 is located before the up-converter 42 as illustrated in FIGS. 13a and 13b. In those cases, the chroma signal b may be taken out either before the AGC circuit 40 (FIG. 13a) or after the AGC circuit 40 (FIG. 13b). The AGC circuit 40 may be inserted between the up-converter 42 and the SAW filter 44 as illustrated in FIG. 13c. In this case, the chroma signal is taken out before the up-converter 42. From a standpoint of the easiness of the construction of the circuit, FIG. 13a or FIG. 13b which allows a low frequency AGC is preferable. While the up-conversion frequency of 10 MHz is used in the above embodiments, a wide range of frequency may be used in practice. A lower limit is determined mainly by a pattern spacing and a shape of the SAW filter and an upper limit is determined by the circuit configuration.

Figure 14:
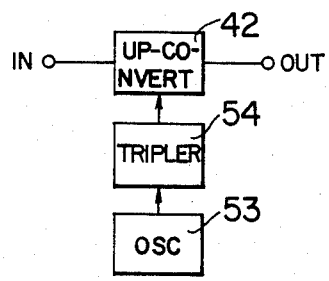
FIG. 14 shows a block diagram of an up-converter circuit.

As shown in FIG. 14, the fixed up-conversion frequency may be generated by tripling an output of a color sub-carrier oscillator 53 (at 3.58 MHz in the NTSC system) by a frequency tripler circuit 54 to produce a signal of 10.74 MHz.

In FIG. 5 or FIG. 12, by changing the oscillation frequency of the oscillator 41, the peaking point of the FM luminance signal can be substantially changed.

Figure 15A:
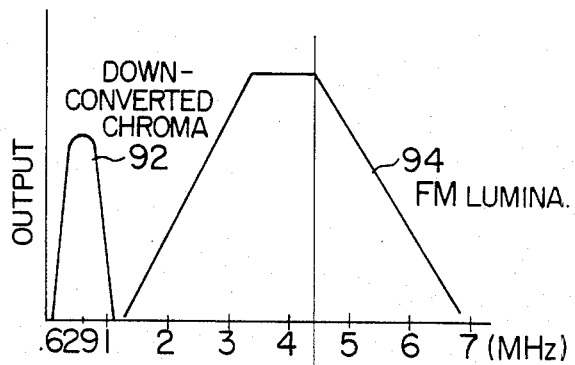
FIGS. 15a and 15b show characteristic curves for illustrating a change of a peaking point.
Figure 15B:
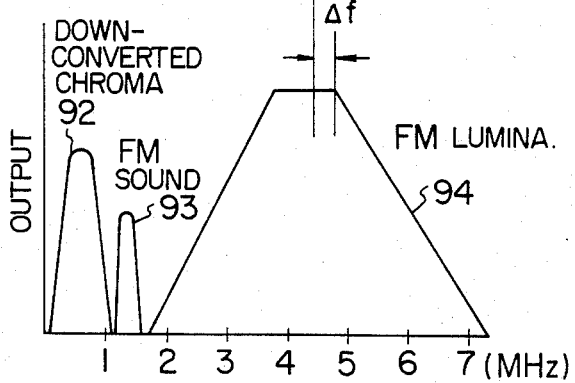

FIG. 15a shows a spectrum of the reproduced signal in the prior art VHS system, which comprises an FM luminance signal 94 (having a carrier frequency of 3.4–4.4 MHz) and a down-converted chroma signal 92 (having a sub-carrier frequency of 629 KHz). In FIG. 15b, an FM luminance signal 93 is present between an FM luminance signal 94 and a down-converted chroma signal 92 so that the FM luminance signal 94 is shifted up by $\Delta f$ relative to FIG. 15a. It has been very difficult in the prior art LC resonance system to change the peaking frequency without changing the profile of the peaking characteristic for the signal having the carrier frequency of the FM luminance signal shifted by $\Delta f$ as shown in FIGS. 15a and 15b.

In the present invention, it can be readily attained merely by changing the frequency of the up-conversion oscillator 41 by $\Delta f$. For example, where the SAW filter 44 is designed to attain an optimum peaking at f=10 MHz in FIG. 15a, the frequency may be changed to (10−$\Delta f$) MHz in FIG. 15b. The filter 77 shown in FIG. 7 which is designed to fully eliminate the down-converted chroma signal 92 of FIG. 15a in the SAW filter 44 can attenuate both the down-converted chroma signal 92 and the FM voice signal 93 in FIG. 15b to acceptable levels. The above method and configuration can be applied to change the peaking frequency depending on the type of tape (for example, oxide tape, metal tape or deposited tape) used.

Figure 16:
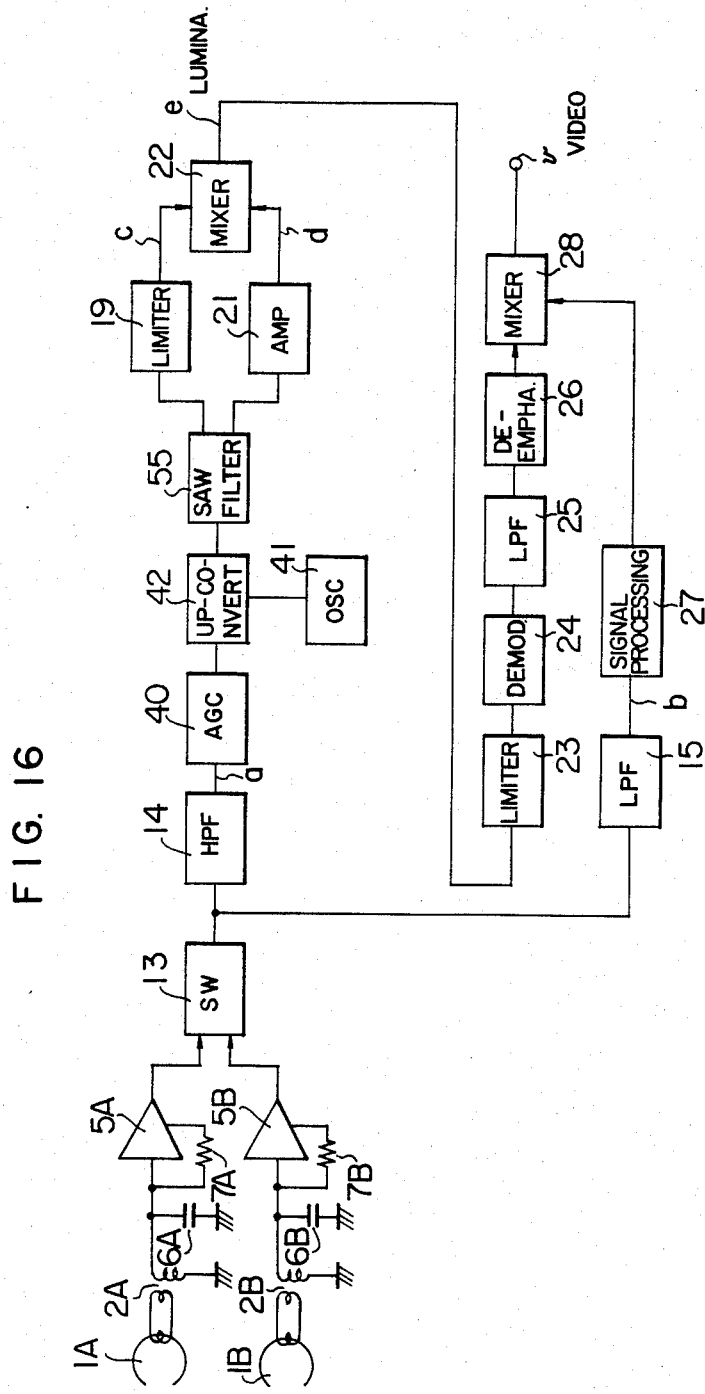
FIG. 16 shows a block diagram of other embodiment of the signal reproducing circuit of the present invention.
Figure 17A:
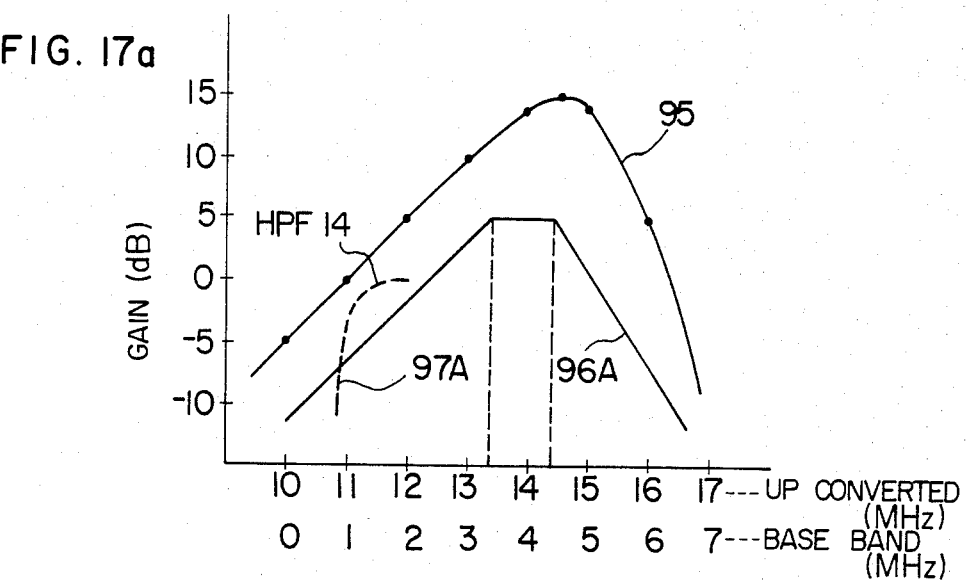
FIGS. 17a and 17b show characteristic curves for illustrating a change of resolution power.
Figure 17B:
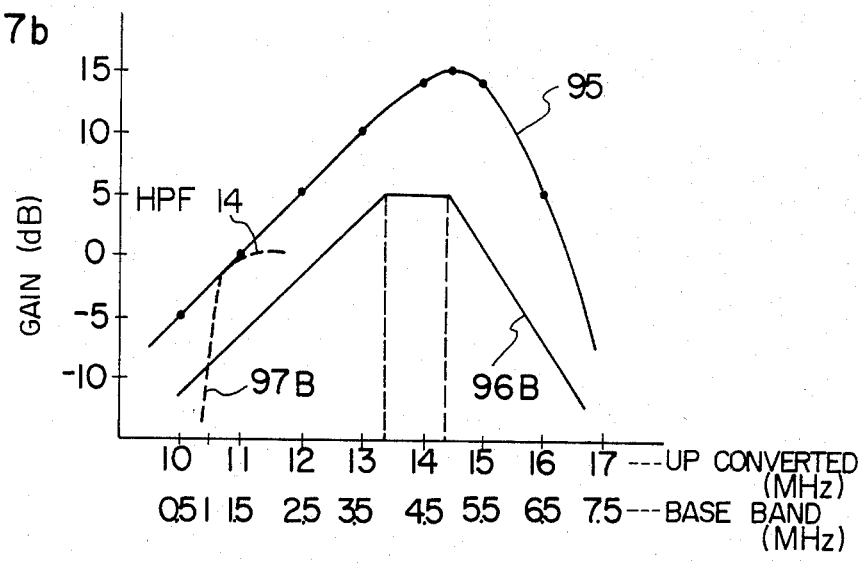

FIG. 16 shows other embodiment of the signal reproducing circuit of the present invention. It differs from the embodiment of FIG. 5 in that it includes a HPF 14 and the filter 77 shown in FIG. 7 for eliminating the chroma signal or the FM voice signal is not included in the frequency characteristic of a SAW filter 55. An advantage of the present embodiment resides in that a resolution power of the video signal can be changed depending on the type of tape by changing a band width. Let us consider a conventional oxide tape and a metal tape or deposited tape having an improved frequency characteristic and a larger high frequency output. By way of an example, it is assumed that the recording on the oxide tape is effected by the conventional VHS system (having FM luminance carrier frequency of 3.4–4.4 MHz) (FIG. 17a) and the recording on the metal tape or the deposited tape is effected at 3.9–4.9 MHz which is higher by 0.5 MHz (FIG. 17b). The purpose thereof is to improve the resolution power. When the SAW filter 44 including the filter 77 shown in FIG. 7 is used, the band of the lower side band of the FM luminance carrier which relates to the resolution power is determined by the filter 77 and the advantage of raising the carrier by 0.5 MHz is not attained. On the other hand, in the embodiment of FIG. 16, the chroma signal and the FM voice signal are eliminated by the HPF 14 in the base band (prior to the up-conversion). In FIGS. 17a and 17b, the characteristic of the HPF 14 is shown by 97A and the characteristic of the SAW filter 55 is shown by 95, and the FM luminance spectra in the base band and after the up-conversion are shown by 96A and 96B, respectively. In the base band, the spectrum 96B is a 0.5 MHz-shifted version of the spectrum 96A. If the spectrum 96A is up-converted by 10 MHz and the spectrum 96B is up-converted by 9.5 MHz, the relations thereof to the peaking characteristic 95 of the SAW filter 55 are identical and an optimum peaking is attained. On the other hand, because of the difference of the up-conversion frequencies in FIG. 17a and FIG. 17b, the HPF 14 having the fixed cut-off frequency after the up-conversion is lower in FIG. 17b by 0.5 MHz than in FIG. 17a. That is, FIG. 17b has a wider band of the lower side band and a higher resolution power than FIG. 17a.

In the embodiment shown in FIGS. 16 and 17, by imparting a high-pass peaking characteristic and a low-pass peaking characteristic to the SAW filter 55, a reversal prevention circuit similar to that of the embodiment of FIG. 5 can be constructed.

Figure 18:
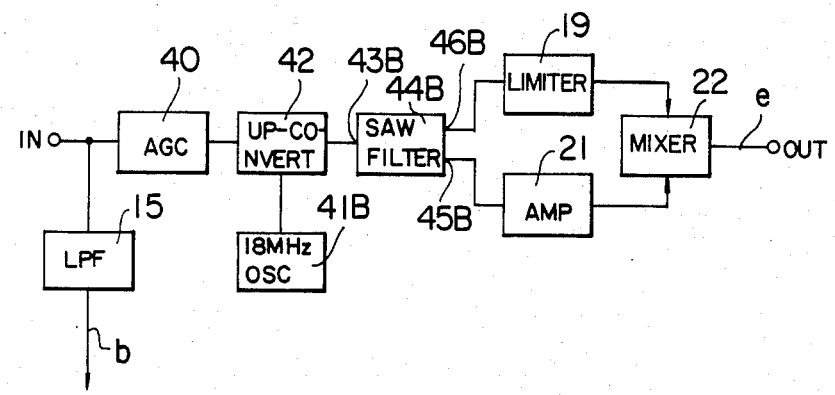
FIG. 18 shows a block diagram of a further embodiment of the signal reproducing circuit of the present invention.
Figure 19:
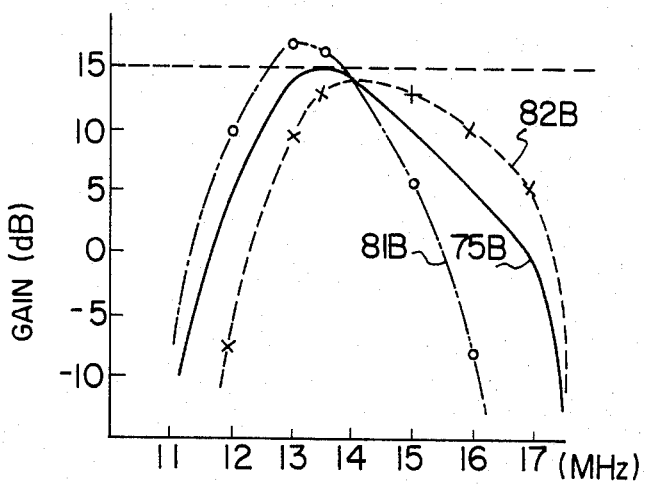
FIG. 19 shows peaking characteristic curves of the SAW filter.

FIG. 18 shows other embodiment of the present invention. Like the embodiment of FIG. 5, a SAW filter 44B has one input electrode 43B and two output electrodes 46B and 45B, but a peaking characteristic is symmetric to the curve 75 of FIG. 9 with respect to a line of a selected frequency as shown by a curve 75B in FIG. 19. Consequently, the input/output characteristic of the input electrode 43B and the output electrode 46B connected to the limiter 19 exhibits a low-pass peaking characteristic 81B and the input/output characteristic of the input electrode 43B and the output electrode 45B connected to the amplifier 21 exhibits a high-pass peaking characteristic 82B, unlike the electrode structure and the input/output characteristics of the SAW filter 44A shown in FIG. 5. In the embodiment of FIG. 18, the frequency of the oscillator 41B is 18 MHz, for example. Since the up-converter 42 is usually a multiplier, when a center frequency of the signals from the heads is 4 MHz, for example, the up-converter 42 produces an output signal of 18±4 MHz. In the present embodiment, the signal of $18-4\ MHz=14\ MHz$ is used. It is different from the embodiment of FIG. 5 in which the oscillation frequency of 10 MHz is used and the signal of $10+4\ MHz=14\ MHz$ is used out of the outputs 10±4 MHz of the up-converter 42 in that the peaking characteristic is line-symmetric on the frequency.

As described above, in the present embodiment, the peaking circuit and the reversal prevention circuit are constructed by the SAW filter to attain a higher performance, less number of elements and more functions than the prior art circuit. Accordingly, when it is applied to the VTR, it greatly contributes to improve the performance and reduce the cost of the VTR.

The reproduced FM signal is up-converted before being applied to the SAW filter in the above embodiment. The up-converter circuit, however, may be omitted if the frequency range of the reproduced FM signal substantially coincides with the frequency range of the SAW filter.

Another embodiment of PAL signal reproducing circuit having a function of preventing chrominance displacement is described hereunder.

A method for preventing a chrominance displacement is disclosed in the Japanese Patent Application No. 73551/1981 filed on May 18, 1981 by the present assignee.

Figure 3:
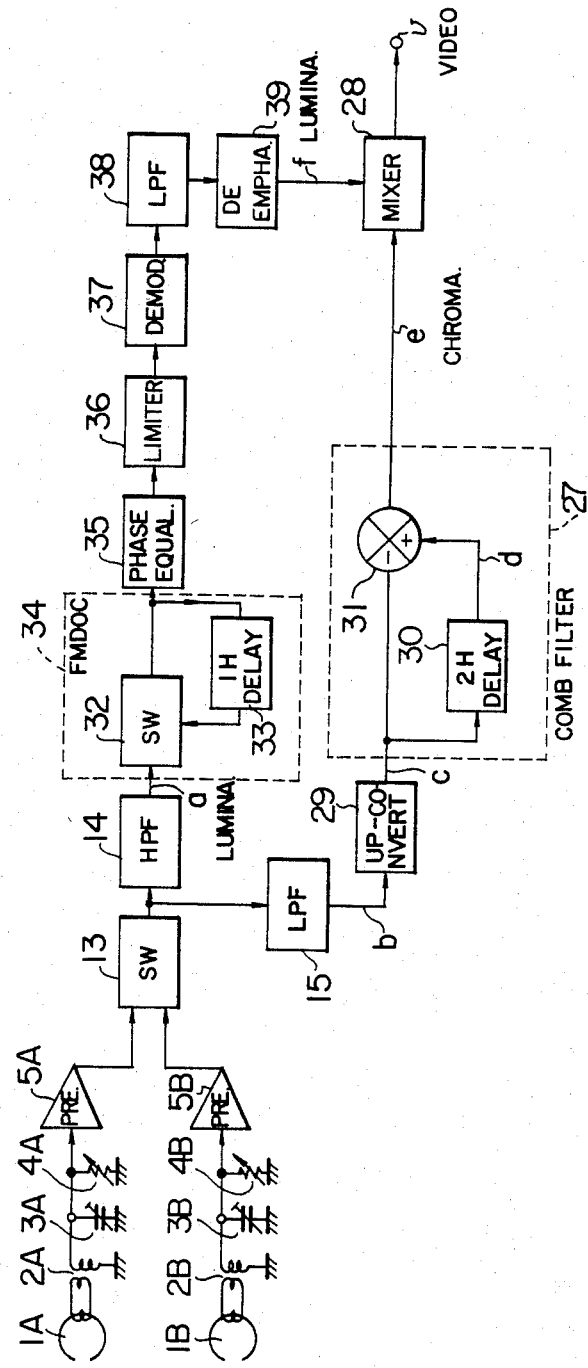
FIG. 3 shows a block diagram of a prior art signal reproducing circuit.
Figure 20:
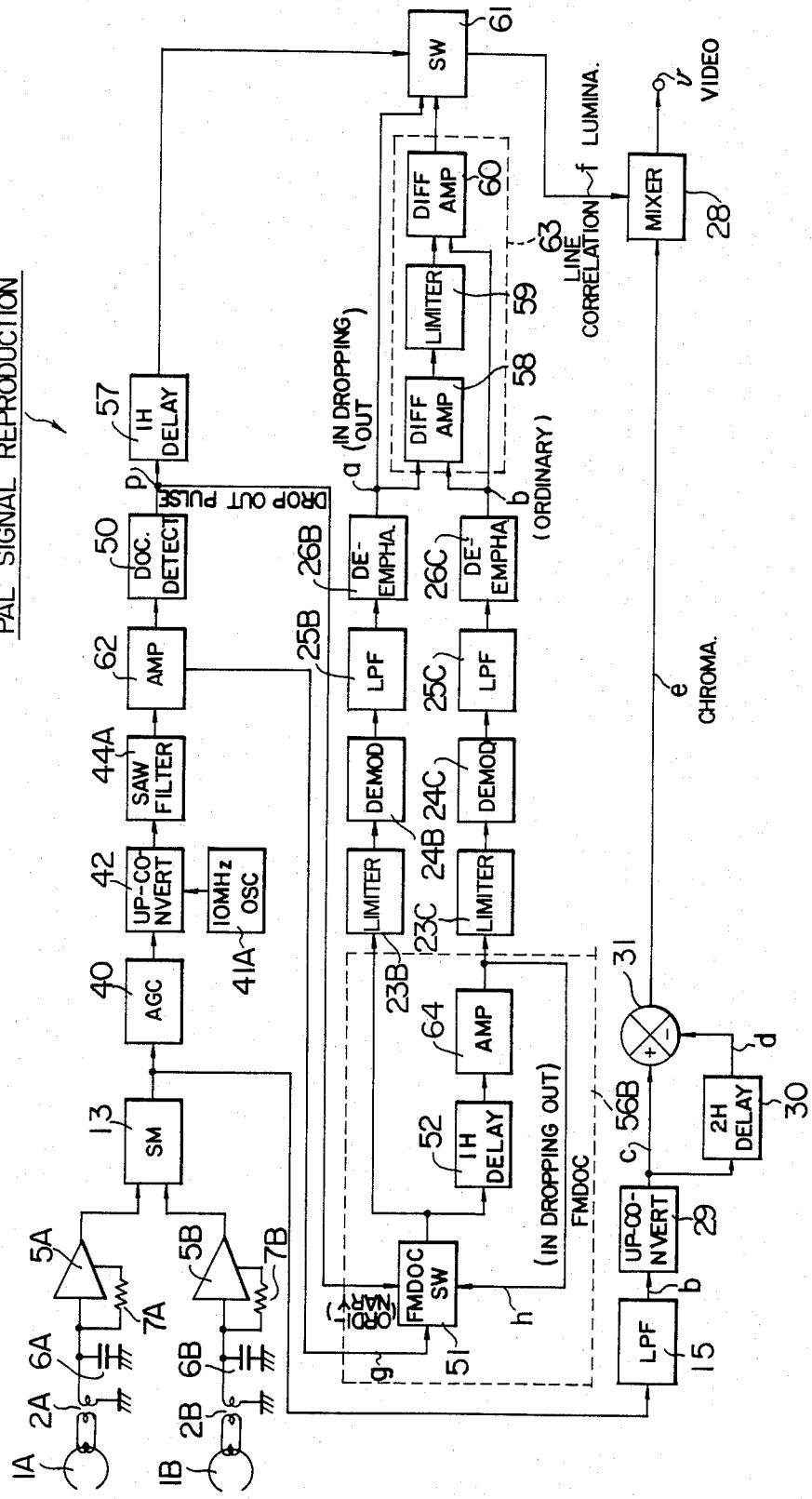
FIG. 20 shows a block diagram of other embodiment of the present invention which has a dropout compensation circuit and a line correlation circuit in a PAL system.

FIG. 20 shows other embodiment of the present invention. It differs from the prior art shown in FIG. 3 in that (1) fixed capacitors 6A and 6B are used in place of the resonance trimmer capacitor 3A and 3B, and feedback resistors 7A and 7B are used in place of the damping resistors 4A and 4B, (2) an AGC circuit 40, an up-converter 42, an oscillator 41A, a reproduction equalizing SAW filter 44A and an amplifier 62 are arranged after the head switching circuit 13, (3) an FM drop-out compensation (FMDOC) circuit 56B comprising an FMDOC switch 51, a wide-band 1H-delay line 52 and an amplifier 64 is provided, and one portion of the output of the switch 51 is supplied to a limiter 23B, a demodulator 24B, a LPF 25B and a deemphasis circuit 26B and the other portion of the output of the switch 51 is supplied to the 1H-delay line 52 and the amplifier 64, thence to a limiter 23C, a demodulator 24C, a LPF 25C and a deemphasis circuit 26c, to form a two-channel demodulation system, and (4) a luminance signal a at the output of the deemphasis circuit 26B and a 1H-delayed luminance signal b at the output of the deemphasis circuit 26c are applied to a line correlation circuit 63 comprising a differential amplifier 58, a limiter 59 and a differential amplifier 60, and a video dropout compensation circuit is formed by adding a switch 61.

Figure 4:
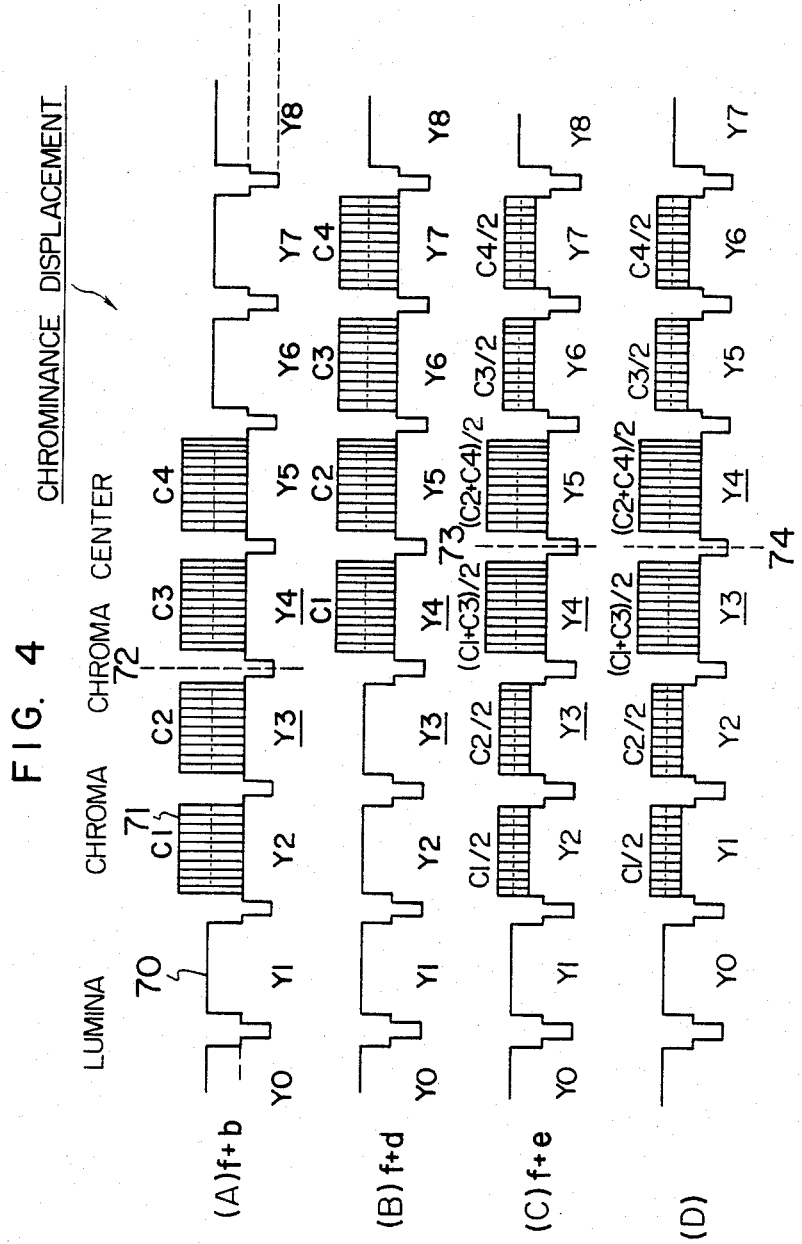
FIG. 4 shows waveforms for illustrating time relations between luminance signals and chroma signals.

An important feature of the present embodiment is that a wide band delay line can be used by the up-conversion (for example, the reproduced FM signal of 4.5±3 MHz is up-converted by 10 MHz to 14.5±3 MHz in the VHS system) so that the 1H-delayed signal which has heretofore been used only to compensate for the dropout because of low center frequency and narrow band can always be used as a main signal. An example of a frequency characteristic of the 1H-delay line is shown in FIG. 21. In the reproduction of the PAL signal, when the 1H-delayed luminance signal b is used as a luminance signal, the chroma signal and the luminance signal have a time relation as shown in FIG. 4 (D). A chroma center 74 is between Y3 and Y4 which is coincident with a center of the original signal shown in FIG. 4 (A). However, the chroma signal spreads from Y1 to Y6. Consequently, even when the dubbing is repeated, the chroma signal does not shift down relative to the luminance signal on the screen and the degradation of the quality of image is minimized. By the line correlation circuit 63 which is a simple construction as shown in FIG. 23, the signal is averaged with the 1H-preceding signal so that a noise and a cross-talk can be eliminated and an S/N ratio is improved by approximately 2 dB.

Another important feature of the present embodiment is that the reproduced FM signal is FM-equalized by the SAW filter 44A having the flat group delay characteristic by up-converting the FM signal. The frequency characteristics of the pre-amplifiers 5A and 5B are substantially flat to provide a circuit which is independent to a dispersion of inductances of the heads. In the FM equalization by the prior art LC resonance circuit, the group delay changes significantly near a resonance point and an amplitude-modulated noise is converted to a phase-modulated noise. As a result, the S/N ratio is lowered. In the SAW filter 44A, on the other hand, the amplitude characteristic and the group delay characteristic can be independently set and hence the S/N ratio can be improved. Examples of an amplitude characteristic 75 and a group delay characteristic 76 of the SAW filter 44A are shown in FIG. 7. The SAW fitler 44A also includes a chroma eliminating filter 77 (HPF or trap filter).

The output of the SAW filter 44A is supplied to the dropout detection circuit 50 through the amplifier 62 so that a drop-out pulse P is produced when the signal level lowers to −20 dB, for example, of a normal level. The drop-out pulse P is reshaped and applied to the switch 51 which normally selects the signal g from the SAW filter 44A and selects the signal h when the drop-out takes place. On the other hand, the drop-out pulse P is applied to the 1H-delay circuit 57 where it is widened to a pulse width which is wider than a drop-out period of the 1H-delayed luminance signal b. This widened pulse is applied to the switch 61. As a result, the 1H-delayed luminance signal b from the line correlation circuit 63 is selected in the normal state and the luminance signal a is selected in the dropout state. The line correlation circuit 63 and the video DOC switch 61 are not necessary for the purpose of preventing the movement of the chroma center but it is preferable to use them because a cost increase is not significant and the performance is greatly improved.

Figure 22:
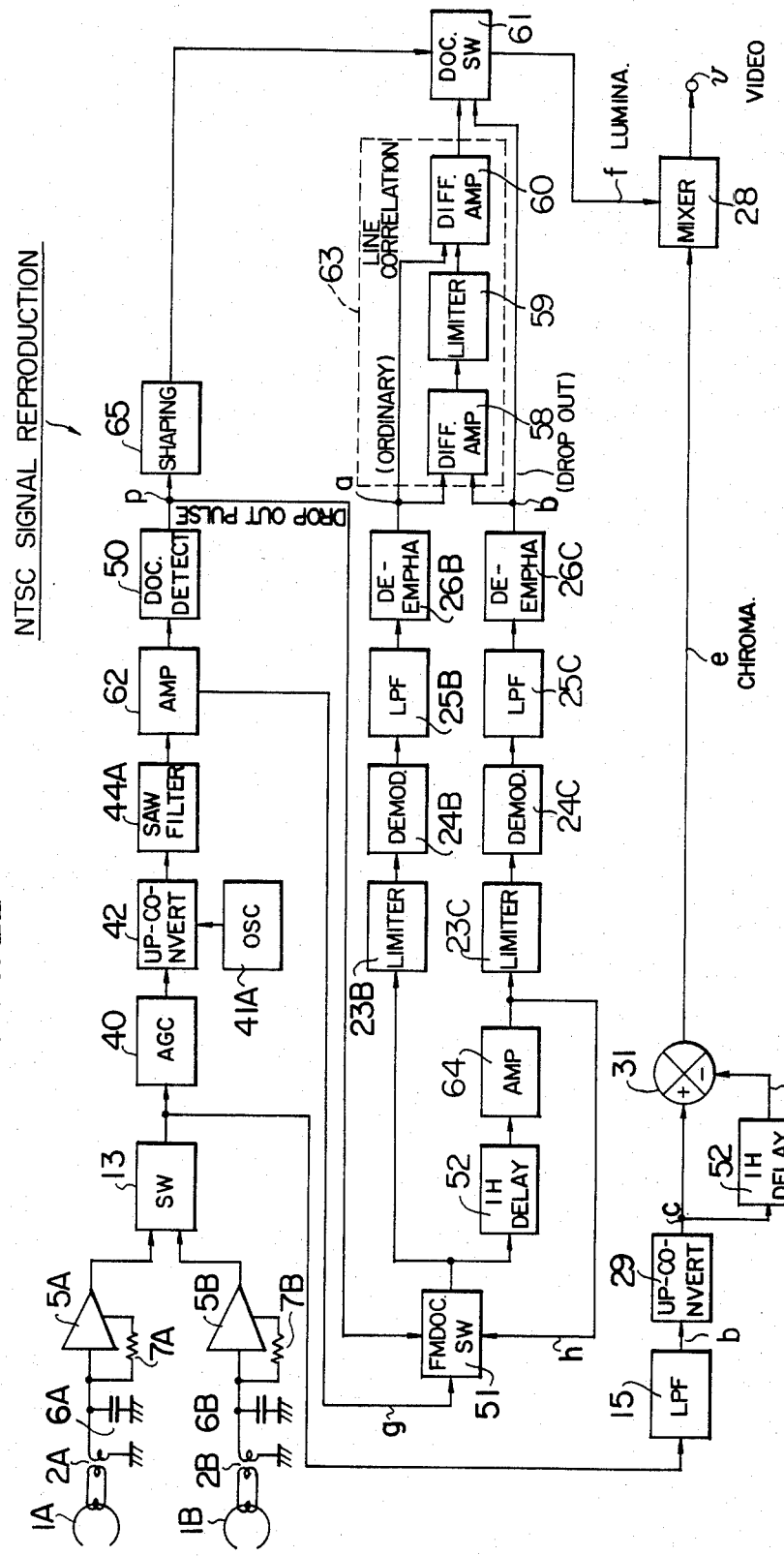
FIG. 22 shows a block diagram of a still further embodiment of the present invention which has a dropout compensation circuit and a line correlation circuit in an NTSC system.

In the NTSC system, on the other hand, the reproducing chroma comb filter is the 1H-delay line 52 and hence the displacement of the chroma center is 0.5 H. Accordingly, the compensation made to the PAL system is not applicable. Thus, the luminance signal a from the line correlation circuit 63 is selected in the normal state and the 1H-delayed luminance signal b is selected in the drop-out state, as shown in FIG. 22. In this case, it is not necessary to delay the drop-out pulse P by 1H-period in the pulse delay circuit 65 but it is widened to a pulse width which is wider than the drop-out period of the luminance signal a, taking a delay time of the luminance signal (usually 500 ns–1.5 μs) between the SAW filter 44A and the video DOC switch 61 into consideration. In the PAL system, if the displacement of the chroma center is not material, the construction of FIG. 22 for the NTSC system may be used, as will be readily understood.

As described hereinabove, according to the present embodiment, the time staggering between the luminance signal and the chroma signal is prevented. This is particularly advantageous when the dubbing is repeated.

We claim:

1. A signal reproducing circuit in a video tape recorder comprising, in an FM luminance signal circuit,
    an up-converter for up-converting a reproduced signal;
    a surface acoustic wave filter connected to the output of said up-converter, and said surface acoustic wave filter including a parallel circuit of a first filter for mainly peaking a high frequency component and a second filter for mainly peaking a low frequency component; and
    an adder for adding an output of said first filter and an output of said second filter.

2. A signal reproducing circuit according to claim 1, further comprising, in the FM luminance signal circuit, a limiter and an amplifier;

said limiter and said amplifier being connected to outputs of said first and second filters respectively, when an up-conversion frequency of said up-converter is lower than a center frequency of said first or second filter; and said limiter and said amplifier being connected to outputs of said second and first filter, respectively when said up-conversion frequency is equal to or higher than the center frequency of said first or second filter.

3. A signal reproducing circuit in a video tape recorder comprising in an FM luminance signal circuit, an up-converter for up-converting a reproduced signal;

a surface acoustic wave filter connected to an output of said up-converter, and said surface acoustic wave filter having a parallel circuit of a first filter for mainly peaking a high frequency component and a second filter for mainly peaking a low frequency component;

a limiter connected to an output of said first filter of said surface acoustic wave filter;

an amplifier connected to an output of said second filter of said acoustic surface wave filter; and an adder for adding an output of said limiter and an output of said amplifier.

4. A signal reproducing circuit in a video tape recorder comprising, in an FM luminance signal circuit, an up-converter for up-converting a reproduced signal;

a surface acoustic wave filter for equalizing the up-converted signal; and an FM signal drop-out compensation circuit including a wide-band 1H (one horizontal scan period) glass delay line for compensating a drop-out of the reproduced signal.

5. A signal reproducing circuit in a video tape recorder comprising, in an FM luminance signal circuit, an up-converter in an FM luminance signal circuit for up-converting a reproduced signal;

a surface acoustic wave filter for equalizing an up-converted signal;

an FM signal drop-out compensation circuit including a wide-band 1H (one horizontal scan period) glass delay line for compensating a dropout of the reproduced signal;

a pair of demodulators for separately demodulating the signal prior to the passage of said 1H-delay line and the signal after the passage of said 1H-delay line; and a line correlation circuit and a video dropout compensation circuit using outputs of said pair of demodulators.

6. A signal reproducing circuit according to claim 5 wherein said surface acoustic filter includes a first filter for mainly peaking a high frequency component and a second filter for mainly peaking a low frequency component.

7. A signal reproducing circuit according to claim 4 or 5 further comprising a comb filter using a 2H-delay line which delays a chroma signal by 1H-period, wherein said signal demodulated after the passage of said 1H-delay line in a FM luminance circuit is used as a PAL FM luminance signal when no drop-out is present.

8. A signal reproducing circuit according to claim 7 wherein said surface acoustic wave filter includes a first filter for mainly peaking a high frequency component and a second filter for mainly peaking a low frequency component.

9. A signal reproducing circuit according to claim 3 or 5 wherein an up-conversion frequency of said up-converter is variable.

10. A signal reproducing circuit accoridng to claim 3 or 5 further comprising an automatic gain control circuit located before said up-converter or between said up-converter and said surface acoustic wave filter.

* * * * *